United States Patent [19]

Ortlieb

[11] Patent Number: 4,516,889
[45] Date of Patent: May 14, 1985

[54] PRECISION ADJUSTABLE CUTTING TOOL
[75] Inventor: Robert M. Ortlieb, Southfield, Mich.
[73] Assignee: DeVlieg Machine Company, Royal Oak, Mich.
[21] Appl. No.: 415,663
[22] Filed: Sep. 7, 1982
[51] Int. Cl.³ ............................................. B23B 29/02
[52] U.S. Cl. .................................... 408/152; 408/153; 408/154; 408/181
[58] Field of Search ..................... 29/568; 82/2 E, 1.2; 408/152, 158, 153, 154, 160, 161, 162, 181, 147, 146

[56] References Cited

U.S. PATENT DOCUMENTS

| | | | |
|---|---|---|---|
| 1,506,484 | 8/1924 | Hart | 408/114 |
| 1,981,224 | 11/1934 | DeVlieg | 409/208 |
| 2,002,991 | 5/1935 | DeVlieg | 409/146 |
| 2,059,091 | 10/1936 | DeVlieg | 409/146 |
| 2,119,705 | 6/1938 | DeVlieg | 74/441 |
| 2,123,825 | 7/1938 | DeVlieg | 409/206 |
| 2,330,692 | 9/1943 | DeVlieg | 408/185 |
| 2,484,480 | 10/1949 | Anderson | 408/181 |
| 2,537,517 | 1/1951 | DeVlieg | 408/153 |
| 2,652,634 | 9/1953 | DeVlieg | 408/238 |
| 2,654,610 | 10/1953 | DeVlieg | 408/181 |
| 2,771,798 | 11/1956 | DeVlieg | 408/188 |
| 2,793,547 | 5/1957 | Benjamin et al. | 408/153 |
| 2,849,902 | 9/1958 | DeVlieg et al. | 408/181 |
| 2,901,935 | 9/1959 | Keller, Jr. et al. | 408/153 |
| 3,011,113 | 11/1961 | Jerue et al. | 409/80 |
| 3,044,323 | 7/1962 | Sweeny | 408/151 |
| 3,069,932 | 12/1962 | Sweeny et al. | 408/185 |
| 3,169,416 | 2/1965 | Carlson et al. | 408/181 X |
| 3,217,569 | 11/1965 | Sweeny | 408/153 |
| 3,232,144 | 2/1966 | Sweeny | 408/153 |
| 3,237,487 | 3/1966 | Widmer et al. | 408/152 |
| 3,262,184 | 7/1966 | Sweeny | 408/153 |
| 3,292,238 | 12/1966 | DeVlieg | 408/226 |
| 3,313,187 | 4/1967 | Benjamin et al. | 408/153 |
| 3,327,386 | 6/1967 | Jerue | 29/568 |
| 3,338,117 | 8/1967 | DeVlieg et al. | 408/153 |
| 3,349,648 | 10/1967 | Holloway | 408/154 |
| 3,402,625 | 9/1968 | Sweeny | 408/146 |
| 3,417,662 | 12/1968 | DeVlieg et al. | 409/207 |
| 3,449,823 | 6/1969 | Jerue | 29/568 |
| 3,599,517 | 8/1971 | Muller | 408/152 X |
| 3,689,988 | 9/1972 | Jerue | 29/560 |
| 3,699,843 | 10/1972 | Sweeny | 408/226 |
| 3,741,672 | 6/1973 | Hedberg | 408/153 X |
| 3,810,299 | 5/1974 | Jerue | 29/560 |
| 3,823,466 | 7/1974 | Jerue | 29/568 |
| 3,823,642 | 7/1974 | Jerue . | |
| 3,947,951 | 4/1976 | Jerue | 29/568 |
| 3,993,565 | 11/1976 | Holthuis | 408/153 X |
| 4,043,696 | 8/1977 | Wohlhaupter | 408/153 X |
| 4,250,775 | 2/1981 | Jerue et al. | 82/1.2 |

FOREIGN PATENT DOCUMENTS

| | | | |
|---|---|---|---|
| 1075404 | 2/1960 | Fed. Rep. of Germany | 408/153 |
| 102911 | 1/1917 | United Kingdom | 408/152 |
| 587318 | 4/1947 | United Kingdom | 408/153 |
| 665231 | 1/1952 | United Kingdom | 408/153 |
| 940340 | 10/1963 | United Kingdom | 408/153 |
| 945221 | 12/1963 | United Kingdom | 408/153 |
| 1405426 | 9/1975 | United Kingdom | 408/154 |
| 1409249 | 10/1975 | United Kingdom | 408/181 |

OTHER PUBLICATIONS

"DeVlieg Microbore 'AR' Automatic Retracting Lay-in Cartridges", (DeVlieg Machine Company, 1980).
"Microbore AH Adjustable Boring Heads", (DeVlieg Machine Company, date unknown).

Primary Examiner—William R. Briggs
Attorney, Agent, or Firm—Harness, Dickey & Pierce

[57] ABSTRACT

A tool is disclosed that offers precision fine adjustment of a cutting tool bit on the tool, having an opening provided with a conical seat, an internally-threaded tool adjustment cartridge having a conical surface engageable with the conical seat, an externally-threaded tool ajustment member threadably engaged within the cartridge, a tensioning mechanism for maintaining the conical surface in self-centering engagement with the conical seat, external gear teeth on the cartridge, and a worm wheel engageable with the external gear teeth of the cartridge to provide for very small movements of the cartridge. Fine adjustment can be performed automatically or manually, and may be performed by access to either axial end of the tool, or to the side thereof adjacent the tool bit.

26 Claims, 15 Drawing Figures

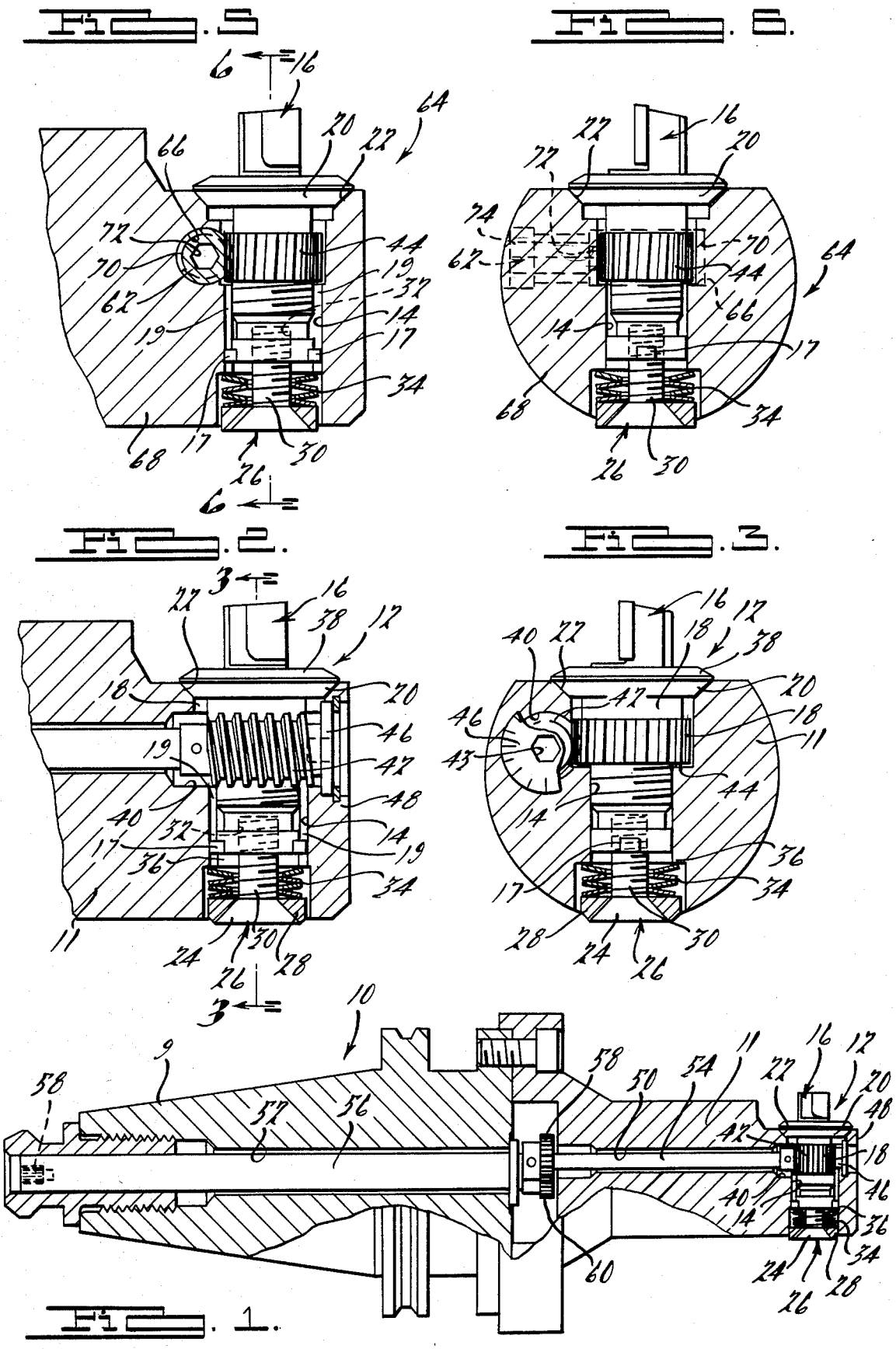

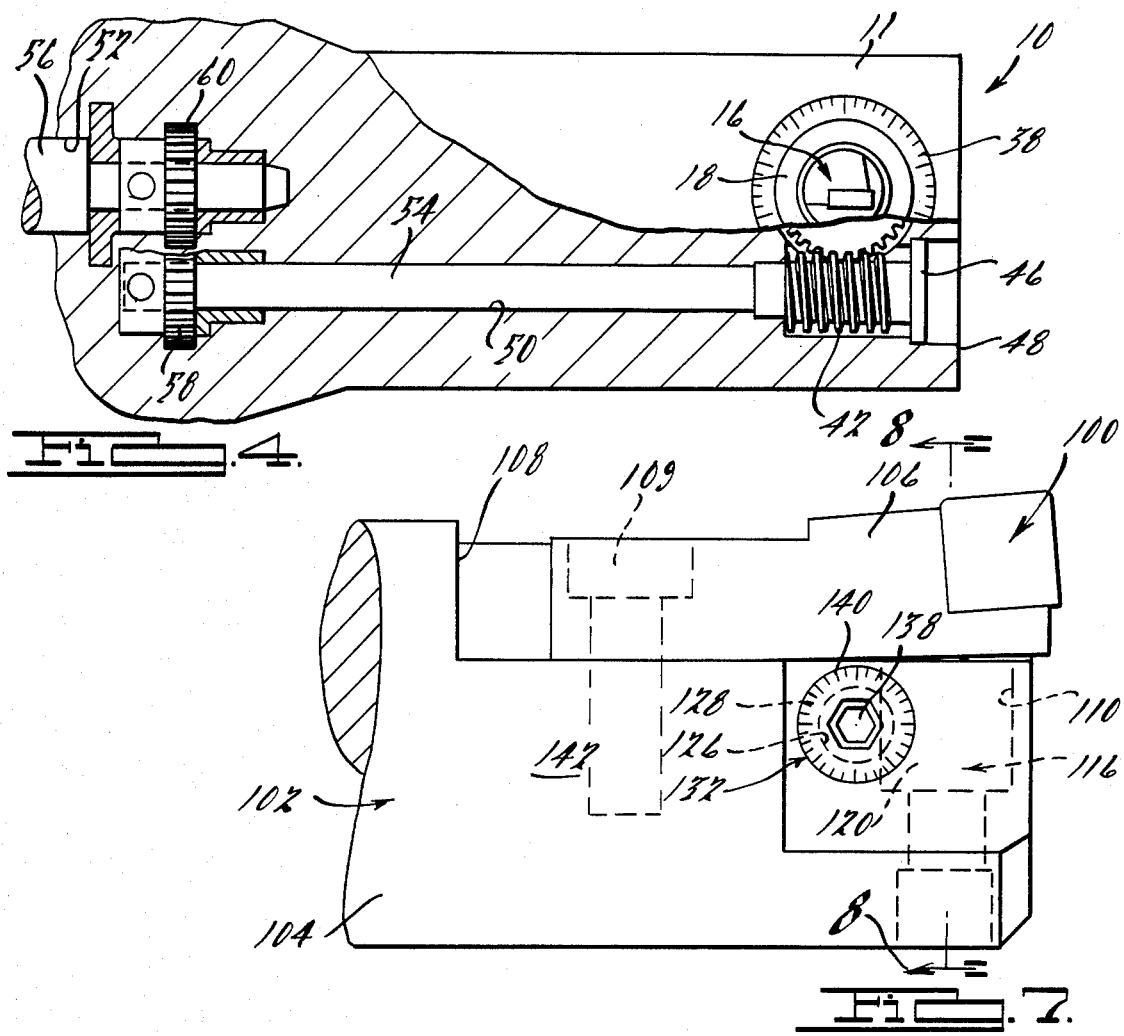
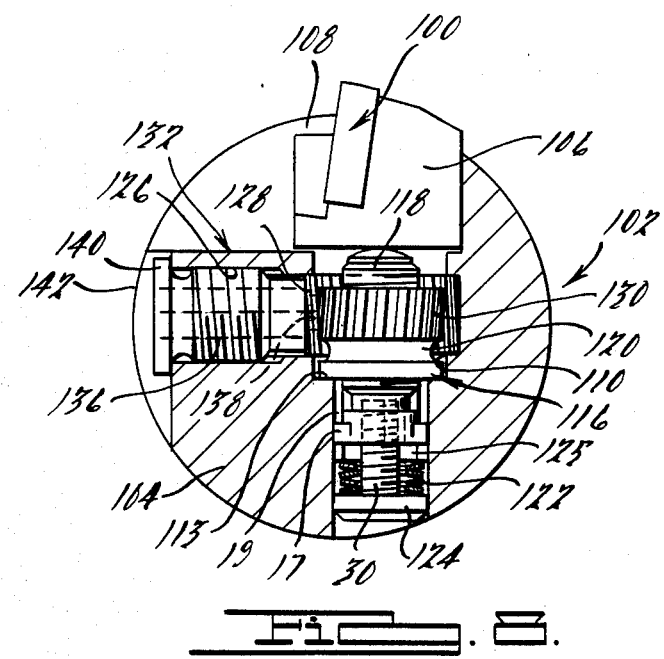

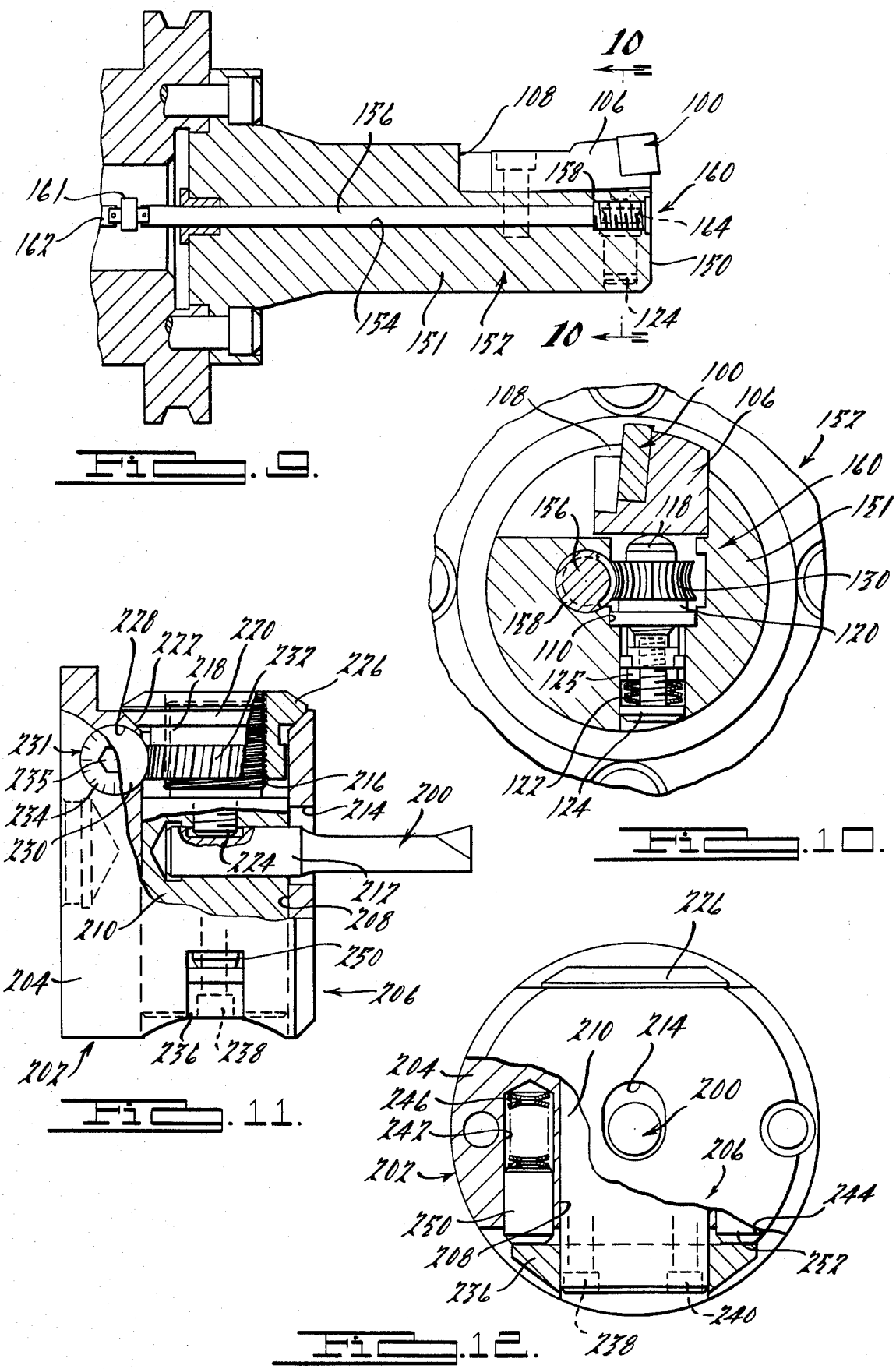
U.S. Patent May 14, 1985 Sheet 3 of 4 4,516,889

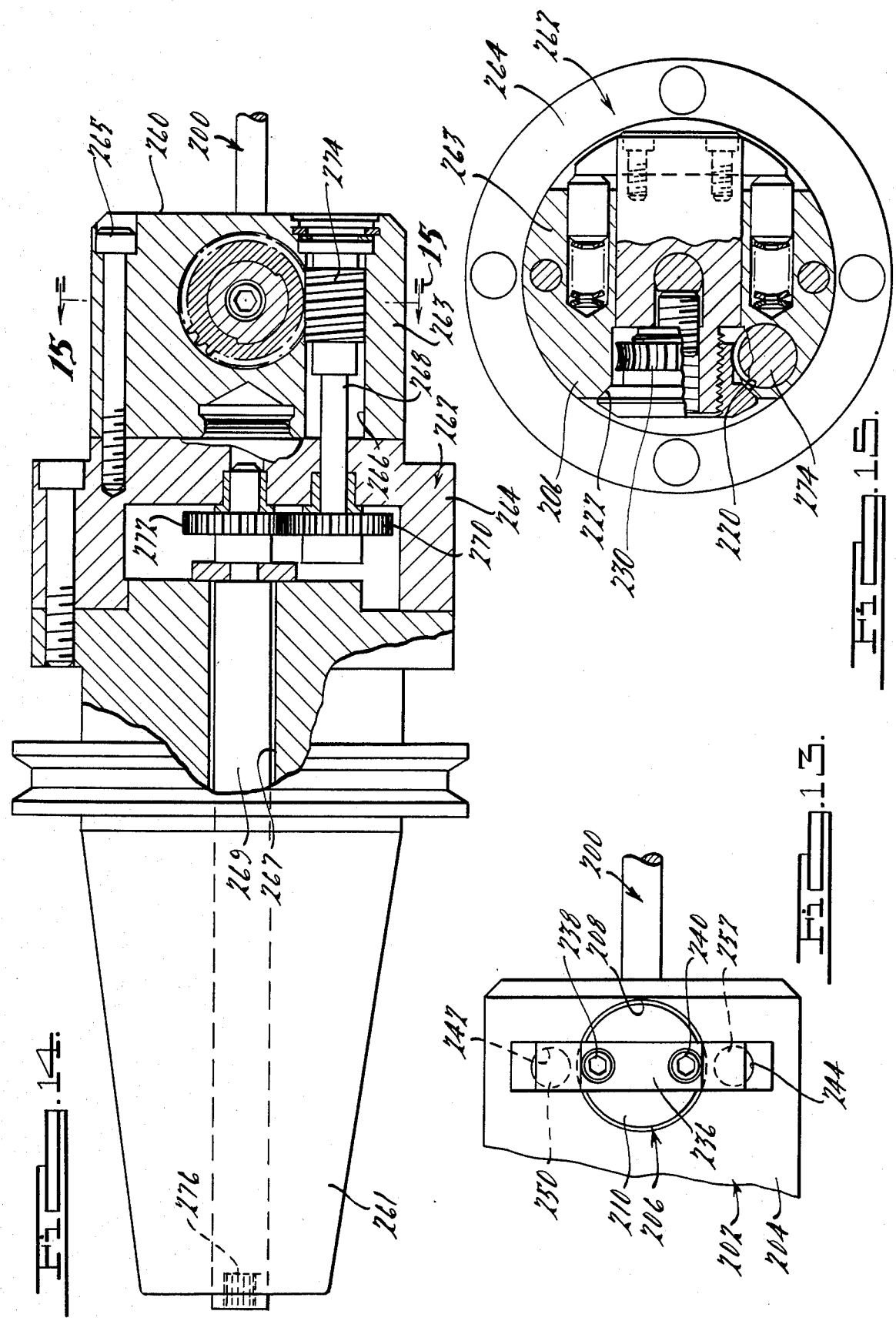

PRECISION ADJUSTABLE CUTTING TOOL

BACKGROUND AND SUMMARY OF THE INVENTION

The present invention relates to metal cutting tools for machine tools and particularly to such tools having precision fine adjustment means which can be operated manually or which can be operated automatically using apparatus such as described in applicant's co-pending application of even date, entitled SYSTEM FOR AUTOMATIC FINE ADJUSTMENT OF TOOLS, the disclosure of which is incorporated herein by reference.

Metal cutting tool bits may typically be preset or ground to a given dimension and thereafter installed in a tool shank member with their cutting edges relatively accurately located in a preselected dimensional position. It is desirable however to have the capability of periodically conveniently readjusting the position of the cutting edge in a highly precise and accurate manner, wherein substantially all inaccuracies resulting from tool wear, the movement of parts, etc., may be eliminated.

The present invention provides an improved mechanism for finely and precisely adjusting the position of the tool bit's cutting edge while the tool bit remains restrained and properly aligned within the tool. An improved tool bit retention mechanism is also provided which positively maintains the tool bit in a self-aligned and self-centered relationship with the tool shank, and which also takes up any slack or backlash between components of the assembly, even while fine adjustments are being performed. Such retention means may also be advantageously employed on tool assemblies that do not include the fine adjustment feature of the invention.

One of the more advantageous features of the tools of the present invention resides in the fact that they retain all the advantages of existing tool cartridges of the "Microbore" type, while adding extra fine adjustment capability which can be performed either manually or automatically in a machine tool.

Access to the adjustment mechanism of the invention may be provided at any one of several positions on the cutting tool, including at the axially inner end of the tool and at or near the axially outer end thereof. The present invention also provides a precision adjustment mechanism that is rugged in construction, capable of accurately maintaining the alignment and the position of the tool bit, convenient to assemble and use, and relatively inexpensive to manufacture.

These and other objects and advantages of the present invention will become apparent from the following description taken in conjunction with the accompanying drawings.

BRIEF DESCRIPTION OF THE DRAWINGS

FIG. 1 is a longitudinal sectional view of a tool and tool bit assembly incorporating the present invention with adjustment access provided from both axial ends of the tool;

FIG. 2 is an enlarged partial longitudinal sectional view of the tool bit portion of FIG. 1;

FIG. 3 is a sectional view taken substantially along line 3—3 of FIG. 2;

FIG. 4 is a partial plan view, partially in cross-section, of the tool and tool bit assembly of FIG. 1;

FIG. 5 is a view similar to FIG. 2 of a tool and tool bit assembly similar to that of FIG. 1 but having adjustment access from the side of the tool;

FIG. 6 is a sectional view taken substantially along line 6—6 of FIG. 5;

FIG. 7 is a partial elevational view of an alternate embodiment of the present invention having adjustment access from the side of the tool;

FIG. 8 is a sectional view taken substantially along line 8—8 of FIG. 7;

FIG. 9 is a partial longitudinal sectional view of a tool and tool bit assembly similar to that of FIG. 7 but having an adjustment access from the axially opposite ends of the tool;

FIG. 10 is a sectional view taken substantially along line 10—10 of FIG. 9;

FIG. 11 is a partial elevational view, with portions broken away, of another alternate embodiment of the present invention having adjustment access from the side of the tool;

FIG. 12 is a front elevational view of the tool and tool bit assembly of FIG. 10 with portions broken away;

FIG. 13 is a partial bottom plan view of the tool and tool bit assembly of FIG. 11;

FIG. 14 is a bottom view, partially in section, of a tool and tool bit assembly similar to that illustrated in FIG. 11 but having adjustment access from the axially inner drive end of the tool; and FIG. 15 is a front elevational view, with portions broken away, of the tool and tool bit assembly of FIG. 14.

DETAILED DESCRIPTION OF THE PREFERRED EMBODIMENTS

FIGS. 1 through 15 of the drawings depict exemplary embodiments of the present invention for purposes of illustration. One skilled in the art will readily recognize from the following discussion that the principles of the invention are equally applicable to tool assemblies of other types and configurations than that shown in the drawings.

Referring to FIGS. 1 to 4, a tool 10 in the form of a boring bar is illustrated having shank 9 and body 11 with adjustable cutting tool cartridge assembly 12 received within cartridge bore 14 extending transversely through body 11. Cartridge assembly 12 includes externally-threaded tool bit 16 which may be advanced or retracted along the axis of cartridge assembly 12 in response to rotation of internally-threaded collar 18. Collar 18 includes conical head 20 that engages a correspondingly conical seat 22 in body 11. Tool bit 16 is keyed to the interior of cartridge bore 14 by means of integral lugs 17 slidably received in slots 19 so that when collar 18 is rotated, tool bit 16 may advance or retract on cartridge 14 but may not rotate. Head portion 24 of biasing screw 26 abuts an annular collar 28 slidably disposed in cartridge bore 14, and shank portion 30 of the biasing screw threadably engages bore 32 extending coaxially through a portion of tool bit 16. A number of disc springs, sometimes referred to as Belleville washers, 34 are compressed between annular collar 28 and internal shoulder 36 in cartridge bore 36. Disc springs 34 resiliently restrain the cartridge assembly 12 such that conical head 20 is seated and self-centered against conical seat 22 and also take up the backlash in the threads of the various components.

In order to adjust the transverse position of tool bit 16, collar 18 is rotated to threadably advance or retract the tool bit. Collar 18 preferably includes graduated markings (shown in FIG. 4) which cooperate with markings on stationary sleeve 38 around the tool bit to indicate the change in the tool bit's transverse position relative to the tool. As described to this point, the assembly will be recognized as being a well known "Microbore" type cartridge unit.

The improvement resides in the provision of a second bore 40 extending through body 11 generally perpendicular and adjacent to cartridge bore 14 and receiving worm gear 42 which engages external gear teeth 44 on collar 18. Worm gear 42 and collar 18 are geared so that many turns of worm gear 42 cause only a small movement of tool bit 16. Thus, a high torque advantage is provided for overcoming the friction between conical head 20 and conical seat 22 on the body 11 and for permitting worm gear 42 to be rotated to very finely and precisely adjust tool bit 16 to a desired position. Worm gear 42 is provided with an extended head portion 46 (as shown in FIG. 3) having hex socket 43 therein to provide convenient manual fine adjustment using a standard hex wrench, as well as being provided with markings cooperable with markings on the front face of body 11 to indicate changes in tool bit position.

Because of the combination of the high torque advantage provided by the gearing between worm gear 42 and collar 18 and the resiliency of disc springs 34, biasing screw 26 need not be loosened to allow collar 18 to rotate during adjustment. Thus, the thread backlash and any gear backlash are taken up, and tool bit 16 remains centered, even during the performance of adjustments. If the range of adjustment ever exceeds that provided for by washers 34, the range of adjustment can be easily reset by changing the position of screw 26 with respect to tool bit 16.

With the tool bit assembly disposed at its axially outer working end, tool 10 also has two axially extending bores 50 and 52 through which extend two shafts 54 and 56 which are operably connected through a pair of pinion gears 58 and 60. The forwardmost or axially outermost shaft 54 engages worm gear at one end thereof, and the rearwardmost shaft 56 has a socket 58 preferably having, for example, ten internal splines therein disposed at its drive end. An automatic drive apparatus (such as that disclosed in the above-mentioned co-pending application) may be connected to the drive end of shaft 56 to automatically control the fine adjustment of tool bit 16 by moving a ten-spline wrench portion of the drive apparatus into the ten-spline socket 58 of shaft 56 and rotating the shaft a desired amount.

Referring to FIGS. 5 and 6, an alternate embodiment of tool bit 16 and tool 10 of FIGS. 1 through 4 is illustrated at 64 wherein tool bit 16 is fine-adjusted manually by control mechanism 62 disposed at the side of tool 64. The second bore 66 through body 68 of tool 64 is generally perpendicular and adjacent to cartridge bore 14 and receives worm gear 70 in engagement with external gear teeth 44 on collar 18. Worm gear 70 is retained by screw 74 threadably secured to tool 64. Worm gear 70 and collar 18 are geared so that many turns of worm gear 70 cause only a small movement of tool bit 16, and thus the high torque advantage discussed above is provided for overcoming the friction between conical collar head 20 and its conical seat 22. Again, it should be noted that because of the combination of the high torque advantage provided by the gearing between worm gear 70 and collar 18 and because of the resiliency of disc springs 34, biasing screw 26 normally need not be loosened to allow collar 18 to rotate during adjustment. Thus, both thread backlash and any gear backlash are taken up, and tool bit 16 remains centered, even during adjustment.

Manual adjustment control mechanism 62 comprises hex socket 72 in worm gear 70 which may be accessed through a central bore in retainer screw 74. Hex socket 72 is adapted to receive a manually operated hex wrench (not shown) to manually control rotation of worm gear 70 and thereby manually fine adjust the tool bit.

Referring to FIGS. 7 and 8, a so-called "lay-in" embodiment of tool bit assembly 100 and tool 102 is illustrated. Tool body 104, as illustrated, has an adjustable cutting tool insert 106 received within an axially-extending slot 108 disposed adjacent the radially outer periphery of tool body 104. Tool insert 106 lays into slot 108 and is secured to body 104 by a screw 109, with tool bit assembly 100 disposed axially outwardly therefrom. A bore 110, perpendicular to slot 108, extends transversely through body 104 and has adjustment cartridge assembly 116 disposed therein comprising an externally-threaded member 118 which abuts tool insert 106 and may be advanced or retracted in response to rotation of internally-threaded collar 120 to resiliently deflect tool insert 106 in order to adjust the position or the cutting edge of tool bit assembly 100. A number of disc springs 122 are disposed around screw 124 and compressed between the head of the screw and an abutment 125 in bore 110 to resiliently hold the lower surface of cartridge assembly 116 seated against shoulder 113 until the tool insert is installed and deflected. Once installed and deflected, tool insert 106 itself biases the lower surface of collar 120 against shoulder 113 in order to take up the backlash in the threads when collar 120 is rotated.

Another bore 126 in body 104 extends generally perpendicularly to bore 110 and is adjacent thereto for receiving worm gear 128 in engagement with external gear teeth 130 on collar 120. Worm gear 128 is retained in place by screw 136 threadably secured to body 104. Worm gear 128 is part of manual adjustment assembly 132, which is similar to that of the embodiment of FIGS. 5 and 6, described above. Adjustment assembly 132 includes a hex socket 134 in the end of worm gear 128 adapted to receive, via a central bore in screw 136, a manually operable hex wrench for rotating worm 128 and thus collar 120 to manually fine-adjust tool bit assembly 100.

Worm gear 128 and collar 120 are again geared so that many turns of worm gear 128 cause only a small movement of tool bit 100. Worm gear 128 is rotated to finely adjust tool bit assembly 100 to a desired radial position. Manual adjustment assembly 132 may also be provided with markings on head portion 140 thereof to indicate changes in tool bit position at the adjacent side 142 of the tool.

Referring to FIGS. 9 and 10, the embodiment of FIGS. 7 and 8 is further modified as at 152 such that tool body 151 has axially-aligned bore 154 extending therethrough for receiving shaft 156. Shaft 156 is attached at its outer end to worm gear 158 of adjustment mechanism 160, and at its axially inner end to universal joint 161 which in turn is attached to shaft 162 which extends to the axially inner end (not shown) of the shank of tool 152. A suitable splined socket (not shown) is provided in the axially inner end of shaft 162 in order to provide for fine adjustment of the tool bit from that end of the tool. Mechanism 160 may also be adjusted manually via an adjusting tool (not shown) insertable in hex socket 164 at the forward or outer end 150 of the tool. Markings indicating changes in tool bit position similar to those in the preceding embodiments may also be provided.

It should be noted that external gear teeth 130 on collar 120 in FIG. 10 (and also in FIG. 15) are shown in an alternate form with concave teeth. Although the straight gear teeth shown in the remainder of the drawings is preferred, such alternate gear may also be used.

FIGS. 11 through 13 illustrate yet another alternative version of tool bit 200 and tool 202 incorporating the present invention. Tool body 204 is illustrated as part of tool 202 and has cutting tool adjustment cartridge assembly 206 received within a transversely-extending bore 208 in body 204. Cartridge assembly 206 includes slide 210 slidably received in cartridge bore 208. Shank portion 212 of a small diameter boring tool bit assembly 200 extends into cartridge bore 208 through elongated slot 214 in tool 202. Slot 214 is somewhat elongated in order to allow tool bit assembly 200 to move parallel to the axis of slide 210 and cartridge bore 208. Adjustment cartridge assembly 206 further comprises an externally-threaded slide portion 216 integrally secured to slide 210 such that slide 210 may be advanced or retracted in response to rotation of internally-threaded collar 218. Collar 218 preferably has a conical head 220 engaging a correspondingly conical seat 222 on body 204. Set screw 224 extends through externally-threaded slide portion 216 to lock tool bit assembly 200 to slide 210.

In order to adjust the radial position of the tool bit assembly collar 218 is rotated to threadably advance or retract slide portion 216 and slide 210. Collar 218 preferably includes graduated markings corresponding with markings on stationary sleeve 226 disposed around head 220 to indicate changes in the tool bit's radial position.

A bore 228 extending through body 204 is generally perpendicular and adjacent to cartridge bore 208 and receives worm gear 230 in engagement with external teeth 232 on collar 218. Worm gear 230 and collar 218 are geared so that many turns of worm gear 230 cause only a small movement of tool bit assembly 200. Thus, as with the other embodiments, a high torque advantage is provided for overcoming the friction between conical head 220 and conical seat 222. Worm gear 230 is rotated to finely and precisely adjust tool bit assembly 200 to a desired radial position.

A manually engageable adjustment mechanism 231 incorporates worm gear 230, as with the previous embodiments. Mechanism 231 includes a hex socket 235 in the axially outer end of worm gear 230 to provide access so that a hex wrench may be used to rotate worm gear 230 and thereby finely adjust the radial position of tool bit assembly 200. The manually engageable adjustment mechanism 231 may also be provided with markings for indicating change in the tool bit position.

A unique and very effective tensioning and anti-rotation arrangement utilizing a cross-beam 236 is provided in this embodiment. Slide 210 is tensioned by cross beam 236, as best illustrated in FIGS. 12 and 13. Cross beam 236 is fixedly secured to the base of slide 210 by two screws 238 and 240. Two bores 242 and 244 are provided in body 204, and two groups of disc springs 246 and two dowel pins 250 and 252 are disposed in bores 242 and 244. The disc springs bias dowel pins 250 and 252 and cross beam 236 outwardly from the tool. Such biasing force also biases cartridge 206 in a direction such that conical head 220 is firmly engaged and self-centered against seat 222. Thus, because of the high torque advantage provided by the gearing between worm gear 230 and collar 218 and because of the resiliency of the disc springs 246, biasing screws 238 and 240 need not be loosened while collar 218 is rotated during adjustment, and any thread or gear backlash is taken up while tool bit assembly 200 remains centered even during such adjustment.

FIGS. 14 and 15 illustrate a variation of the embodiment of FIGS. 11 to 13. Tool 262 includes modular tool body 263 attached to a connecting portion 264 by a plurality of bolts 265, which in turn is bolted to shank 261. Tool 262 has a pair of axially extending bores 266 and 267 through which extend two shafts 268 and 269, operably interconnected by a pair of pinion gears 270 and 272. Shaft 268 has worm gear 274 connected to its outer end and the gear 270 at the opposite end. Shaft 269 has a splined socket 276 in the axially inner end thereof. A manual wrench, or an automatically-controlled drive mechanism such as disclosed in the above-mentioned co-pending application, may be engaged with socket 276 to drive adjustment cartridge assembly 206 to finely adjust the position of the tool bit. Alternatively, movement of the adjustment cartridge assembly 206 may be performed manually from the front of the tool, as described above, by a manually operable hex wrench.

The foregoing discussion and the accompanying drawings describe and illustrate preferred embodiments of the present invention. One skilled in the art will readily recognize, however, that the invention is susceptible to modification, variation and change without departing from the proper scope or fair meaning of the following claims.

I claim:

1. In a cutting tool assembly including a tool having an opening provided with a seat, an internally-threaded collar member having a surface engageable with said seat, externally-threaded tool bit adjustment means threadably engaging said collar member, said tool bit adjustment means being axially movable relative to the axis of said opening in response to rotation of said collar member, for selectively adjusting the position of a cutting tool bit relative to said tool, the improvement comprising: retention means engaged with said tool bit adjustment means for resiliently biasing said surface of said collar member against said seat to maintain said collar member in a self-centering relationship relative to said opening; first gear means on said collar; worm gear means in a driving relationship with said first gear means, rotation of said worm gear means causing rotation of said collar member in order to perform fine adjustments to the axial position of said tool bit adjustment means relative to said opening, said worm gear means and said retention means cooperating to maintain said collar member in said self-centering relationship as said fine adjustments are performed; said seat of said opening being conical in shape and said surface on said collar member having a complimentary conical shape, said conical seat and said conical surface tending to maintain said collar member in said self-centering relationship; said tool further having at least one longitudinally-extending aperture extending therethrough; and shaft means rotatably disposed within said aperture, said shaft means being drivingly connected to said worm gear means for rotating said worm gear means in order to perform said fine adjustment of the position of said tool bit adjustment means.

2. The improvement according to claim 1, wherein said tool bit adjustment means comprises an externally-threaded elongated member slidably disposed within said opening and means for restraining said elongated member from rotation in said opening, said collar member being axially fixed relative to said opening, said elongated member threadably engaging said axially-fixed collar member for axial movement relative to said collar member as said collar member is rotated, said elongated member further having an internally-threaded bore extending at least partially therethrough, said retention means including an externally-threaded biasing screw extending into said internally-threaded bore and threadably engaging said elongated member, said retention means further including resilient biasing means for biasing said biasing screw and said elongated member in a direction to maintain said collar member in engagement with said seat.

3. In a cutting tool assembly including a tool having an opening provided with a seat, an internally-threaded collar member having a surface engageable with said seat, externally-threaded tool bit adjustment means threadably engaging said collar member, said tool bit adjustment means being axially movable relative to the axis of said opening in response to rotation of said collar member for selectively adjusting the position of a cutting tool bit relative to said tool, the improvement comprising: retention means engaged with said tool bit adjustment means for resiliently biasing said surface of said collar member against said seat to maintain said collar member in a self-centering relationship relative to said opening; first gear means on said collar; and worm gear means in a driving relationship with said first gear means, rotation of said worm gear means causing rotation of said collar member in order to perform fine adjustments to the axial position of said tool bit adjustment means relative to said opening, said worm gear means and said retention means cooperating to maintain said collar member in said self-centering relationship as said fine adjustments are performed; said seat of said opening being conical in shape and said surface on said collar member having a complimentary conical shape, said conical seat and said conical surface tending to maintain said collar member in said self-centering relationship.

4. The improvement according to claim 3, wherein said tool bit adjustment means comprises an externally-threaded elongated member slidably disposed within said opening and and means for restraining said elongated member from rotation in said opening, said collar member being axially fixed relative to said opening, said elongated member threadably engaging said axially-fixed collar member for axial movement relative to said collar member as said collar member is rotated, said elongated member further having an internally-threaded bore extending at least partially therethrough, said retention means including an externally-threaded biasing screw extending into said internally-threaded bore and threadably engaging said elongated member, said retention means further including resilient biasing means for biasing said biasing screw and said elongated member in a direction to maintain said collar member in engagement with said seat.

5. The improvement according to claim 3, wherein said opening in said tool includes an internal abutment portion and said biasing screw includes a head portion thereon, said resilient biasing means including at least one disc spring compressingly disposed between said head portion and said abutment portion.

6. The improvement according to claim 5, wherein said tool has at least one longitudinally-extending aperture extending therethrough, shaft means rotatably disposed within said aperture, said shaft means being drivingly connected to said worm gear means for rotating said worm gear means in order to perform said fine adjustment of the position of said cutting tool bit.

7. The improvement according to claim 3, wherein said tool bit adjustment means comprises an externally-threaded elongated member slidably disposed within said opening, said elongated member threadably engaging said collar member for axial movement relative to the axis of said opening as said collar member is rotated, said tool bit adjustment means further including a slide member slidably movable in said opening in said tool, said slide member being secured to said elongated member for movement therewith, and a cutting tool bit secured to said slide member for movement therewith.

8. The improvement according to claim 7, wherein said retention means comprises a beam member secured to said slide member, at least one pin member slidably received in a bore in said tool, means in said bore for resiliently biasing said pin away from said tool and into engagement with said beam member, said pin member and biasing means thereby resiliently biasing said slide and said elongated member in a direction away from said tool to maintain said collar member in engagement with said seat.

9. The improvement according to claim 8, wherein said tool has at least one longitudinally-extending aperture extending therethrough, shaft means rotatably disposed within said aperture, said shaft means being drivingly connected to said worm gear means for rotating said worm gear means in order to perform said fine adjustments of the position of said tool bit means.

10. A cutting tool assembly comprising a tool having a first bore extending transversely therethrough, an internally-threaded tool cartridge assembly rotatably received in said first bore, an externally-threaded tool bit member threadably engaged by said tool cartridge, said tool bit member being transversely movable relative to said tool, but rotationally restrained relative to said first bore, whereby said member may be advanced or retracted in response to rotation of said tool cartridge, said tool having a conical seat at an outer end of said first bore, said tool cartridge including a collar member with a conical surface thereon, said conical surface being engageable with said conical seat for coaxially self-centering said collar member and said tool bit member relative to the axis of said first bore, retention means engaging said tool bit member and said tool for maintaining said conical surface in said self-centering engagement with said conical seat, said retention means including spring means for biasing said conical surface toward said self-centering engagement with said conical seat, said tool cartridge including external gear teeth thereon, said tool having a second bore extending axially therethrough in a direction generally perpendicular and adjacent to said first bore; a worm gear rotatably received within said second bore in meshing engagement with said external gear teeth on said tool cartridge; whereby said tool cartridge rotates in response to rotation of said worm gear to perform fine adjustments to the transverse position of said tool bit member, said retention means maintaining said conical surface of said tool cartridge in said self-centering engagement with said conical seat while said worm gear is rotated to perform said fine adjustments.

11. A cutting tool assembly according to claim 10, wherein said tool has at least one axially-extending aperture extending therethrough and communicating with said second bore, shaft means rotatably disposed within said aperture, said shaft means drivingly connected to said worm gear for rotating said worm gear in order to perform said fine adjustments to the transverse position of said tool bit member.

12. A cutting tool assembly according to claim 10, wherein said tool bit member includes an externally-threaded elongated member disposed within said first bore, said elongated member threadably engaging said collar member for said axial movement relative to said collar member as said collar member is rotated, said elongated member further having an internally-threaded bore extending at least partially therethrough, said retention means including an externally-threaded biasing screw extending into said internally threaded bore and threadably engaging said elongated member, said spring means biasing said biasing screw and said elongated member in a direction to maintain said conical surface on said collar member in engagement with said conical seat.

13. A cutting tool assembly according to claim 12, wherein said first bore in said tool includes an internal shoulder portion and said biasing screw includes a head portion thereon, said spring means including at least one disc spring compressingly disposed between said head portion and said shoulder.

14. A cutting tool assembly according to claim 13, wherein said tool has at least one axially-extending aperture extending therethrough and communicating with said second bore, shaft means rotatably disposed within said aperture, said shaft means being drivingly connected to said worm gear for rotating said worm gear in order to perform said fine adjustments to the transverse position of said tool bit member.

15. In a cutting tool assembly including a tool having an opening provided with a seat, an internally-threaded collar member having a surface engageable with said seat, externally-threaded tool bit adjustment means threadably engaging said collar member, said tool bit adjustment means being axially movable relative to the axis of said opening in response to rotation of said collar member for selectively adjusting the position of a cutting tool bit relative to said tool, the improvement comprising: retention means engaged with said tool bit adjustment means for resiliently biasing said surface of said collar member against said seat to maintain said collar member in a self-centering relationship relative to said opening; first gear means on said collar; worm gear means in a driving relationship with said first gear means, rotation of said worm gear means causing rotation of said collar member in order to perform fine adjustments to the axial position of said tool bit adjustment means relative to said opening, said worm gear means and said retention means cooperating to maintain said collar member in said self-centering relationship as said fine adjustments are performed; said seat of said opening being conical in shape and said surface on said collar member having a complimentary conical shape, said conical seat and said conical surface tending to maintain said collar member in said self-centering relationship; said tool having at least one laterally-extending aperture extending therethrough; and shaft means rotatably disposed within said aperture, said shaft means being drivingly connected to said worm gear means for rotating said worm gear means in order to perform said fine adjustment of the position of said tool bit adjustment means.

16. The improvement according to claim 15, wherein said tool bit adjustment means comprises an externally-threaded elongated member slidably disposed within said opening and means for restraining said elongated member from rotation in said opening, said collar member being axially fixed relative to said opening, said elongated member threadably engaging said axially-fixed collar member for axial movement relative to said collar member as said collar member is rotated, said elongated member further having an internally-threaded bore extending at least partially therethrough, said retention means including an externally-threaded biasing screw extending into said internally-threaded bore and threadably engaging said elongated member, said retention means further including resilient biasing means for biasing said biasing screw and said elongated member in a direction to maintain said collar member in engagement with said seat.

17. The improvement according to claim 15, wherein said opening in said tool includes an internal abutment portion and said biasing screw includes a head portion thereon, said resilient biasing means including at least one disc spring compressingly disposed between said head portion and said abutment portion.

18. A cutting tool assembly comprising a tool having a first bore extending transversely therethrough, an internally-threaded tool cartridge assembly rotatably received in said first bore, an externally-threaded tool bit member threadably engaged by said tool cartridge, said tool bit member being transversely movable relative to said tool, but rotationally restrained relative to said first bore, whereby said tool bit member may be advanced or retracted in response to rotation of said tool cartridge, said tool having a conical seat at an outer end of said first bore, said tool cartridge including a collar member with a conical surface thereon, said conical surface being engageable with said conical seat for coaxially self-centering said collar member and said tool bit member relative to the axis of said first bore, retention means engaging said tool bit member and said tool for maintaining said conical surface in said self-centering engagement with said conical seat, said retention means including spring means for biasing said conical surface toward said self-centering engagement with said conical seat, said tool cartridge including external gear teeth thereon, said tool having a second bore extending transversely therethrough in a direction generally perpendicular and adjacent to said first bore; a worm gear rotatably received within said second bore in meshing engagement with said external gear teeth on said tool cartridge; whereby said tool cartridge rotates in response to rotation of said worm gear to perform fine adjustments to the transverse position of said tool bit member, said retention means maintaining said surface of said tool cartridge in said self-centering engagement with said conical seat while said worm gear is rotated to perform said fine adjustments.

19. The improvement according to claim 1, wherein said opening in said tool includes an internal abutment portion and said biasing screw includes a head portion thereon, said resilient biasing means including at least one disc spring compressingly disposed between said head portion and said abutment portion.

20. A cutting tool assembly according to claim 18, wherein said tool bit member includes an externally-threaded elongated member disposed within said first bore, said elongated member threadably engaging said collar member for axial movement relative to the axis of said first bore as said collar member is rotated, said elongated member further having an internally-threaded bore extending at least partially therethrough, said retention means including an externally-threaded biasing screw extending into said internally threaded bore and threadably engaging said elongated member, said spring means biasing said biasing screw and said elongated member in a direction to maintain said conical surface on said collar member in engagement with said conical seat.

21. A cutting tool assembly according to claim 20, wherein said first bore in said tool includes an internal shoulder portion and said biasing screw includes a head portion thereon, said spring means including at least one disc spring compressingly disposed between said head portion and said shoulder.

22. A cutting tool assembly comprising a tool having a first bore extending transversely therethrough, an internally-threaded tool cartridge assembly rotatably received in said first bore, an externally-threaded slide member threadably engaged by said tool cartridge, said slide member being slidably movable in said first bore and having a cutting tool bit member attached thereto, said tool having a conical seat at an outer end of said first bore, said tool cartridge including a collar member with a conical surface thereon, said conical surface being engageable with said conical seat for coaxially self-centering said collar member and said slide member relative to the axis of said first bore, retention means engaging said slide member and said tool for maintaining said conical surface in said self-centering engagement with said conical seat and for restraining said slide member from rotation relative to said first bore, said retention means including spring means for biasing said conical surface toward said self-centering engagement with said conical seat, said tool cartridge including external gear teeth thereon, said tool having a second bore extending therethrough in a direction generally perpendicular and adjacent to said first bore, a worm gear rotatably received within said second bore in meshing engagement with said external gear teeth on said tool cartridge, whereby said tool cartridge rotates in response to rotation of said worm gear to perform fine adjustments to the transverse position of said slide member and said cutting tool bit member, said retention means maintaining said conical surface of said tool cartridge in said self-centering engagement with said conical seat while said worm gear is rotated to perform said fine adjustments.

23. A cutting tool assembly according to claim 22, wherein said tool has at least one longitudinally-extending aperture extending therethrough and communicating with said second bore, shaft means rotatably disposed within said aperture, said shaft means drivingly connected to said worm gear for rotating said worm gear in order to perform said fine adjustments to the transverse position of said slide member.

24. A cutting tool assembly according to claim 22, wherein said retention means comprises a beam member secured to an end of said slide member, at least one pin member slidably received in a third bore in said tool, means in said third bore for resiliently biasing said pin away from said tool and into engagement with said beam member, said pin member resiliently biasing said slide member in a direction to maintain said conical surface of said collar member in engagement with said conical seat.

25. A cutting tool assembly according to claim 24, wherein said retention means further comprises an elongated opening in said tool, said beam member being received in said elongated opening, whereby said slide member is restrained from rotation relative to said first bore.

26. A cutting tool assembly according to claim 25, wherein said tool has at least one longitudinally-extending aperture extending therethrough and communicating with said second bore, shaft means rotatably disposed within said aperture, said shaft means being drivingly connected to said worm gear for rotating said worm gear in order to perform said fine adjustments to the transverse position of said slide member.

* * * * *